United States Patent [19]
Thomaswick

[11] 3,887,071
[45] June 3, 1975

[54] ARTICLE TRANSPORTING RACK

[75] Inventor: Ronald J. Thomaswick, Kittanning, Pa.

[73] Assignee: PPG Industries, Inc., Pittsburgh, Pa.

[22] Filed: June 29, 1973

[21] Appl. No.: 375,197

[52] U.S. Cl. .............................................. 206/454
[51] Int. Cl. ........................................... B65d 85/48
[58] Field of Search ........... 206/386, 449, 448, 451, 206/452, 453, 454; 108/53, 54, 55; 211/41, 175; 214/10.5

[56] References Cited
UNITED STATES PATENTS

| | | | |
|---|---|---|---|
| 2,926,792 | 3/1960 | Seiz | 108/53 |
| 3,147,860 | 9/1964 | Kean | 206/448 |
| 3,209,905 | 10/1965 | Kean | 206/386 |
| 3,533,502 | 10/1970 | Hansen | 206/386 |
| 3,809,234 | 5/1974 | Kurick | 206/448 |

Primary Examiner—Donald F. Norton
Attorney, Agent, or Firm—Donald Carl Lepiane

[57] ABSTRACT

A rack for transporting articles such as automotive sidelites having an improved (1) frame for supporting a base, (2) end restraint members, and (3) webbing restraint system is disclosed. The frame has a pair of solid rigid support members, in the preferred embodiment each having a generally Z-shaped configuration, held in spaced relationship. The base includes a pair of stationary runners and movable runners to support the articles. Each of the end restraint members ride on the solid support members and are detachably secured to the solid support members. The webbing restraint system includes a first webbing having an end connected to tension-applying facilities normally connected to the frame and its course around back wall of the rack and over the top of the articles and the other end having a loop to receive a second webbing. The second webbing has one end attached to the frame and its course over the surface of the outermost article, through the loop, down over the surface of the outermost article, with the other end attached to the base. Drawing the end of the first webbing through the tension-applying facilities urges the articles against the back wall of the rack.

10 Claims, 6 Drawing Figures

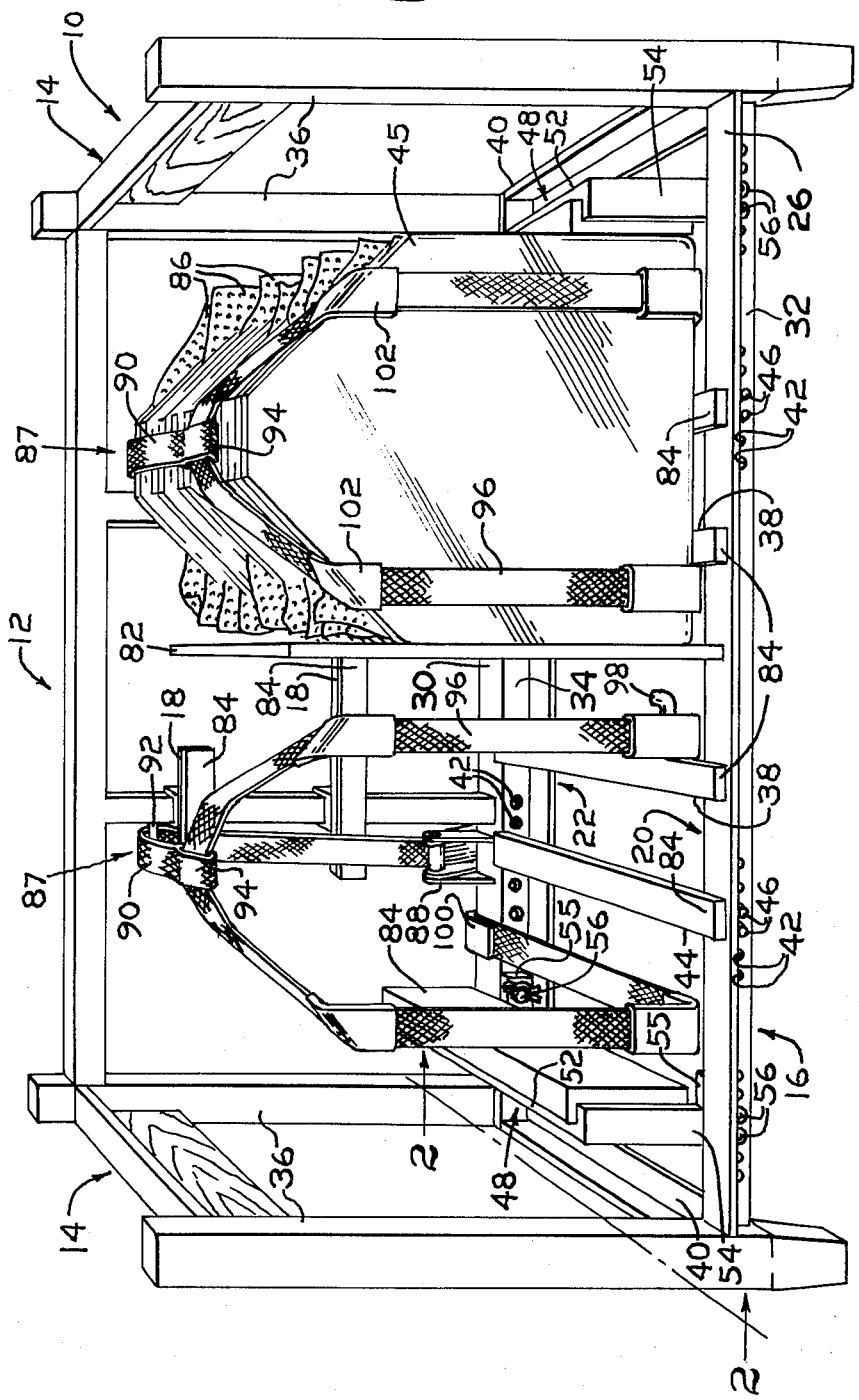

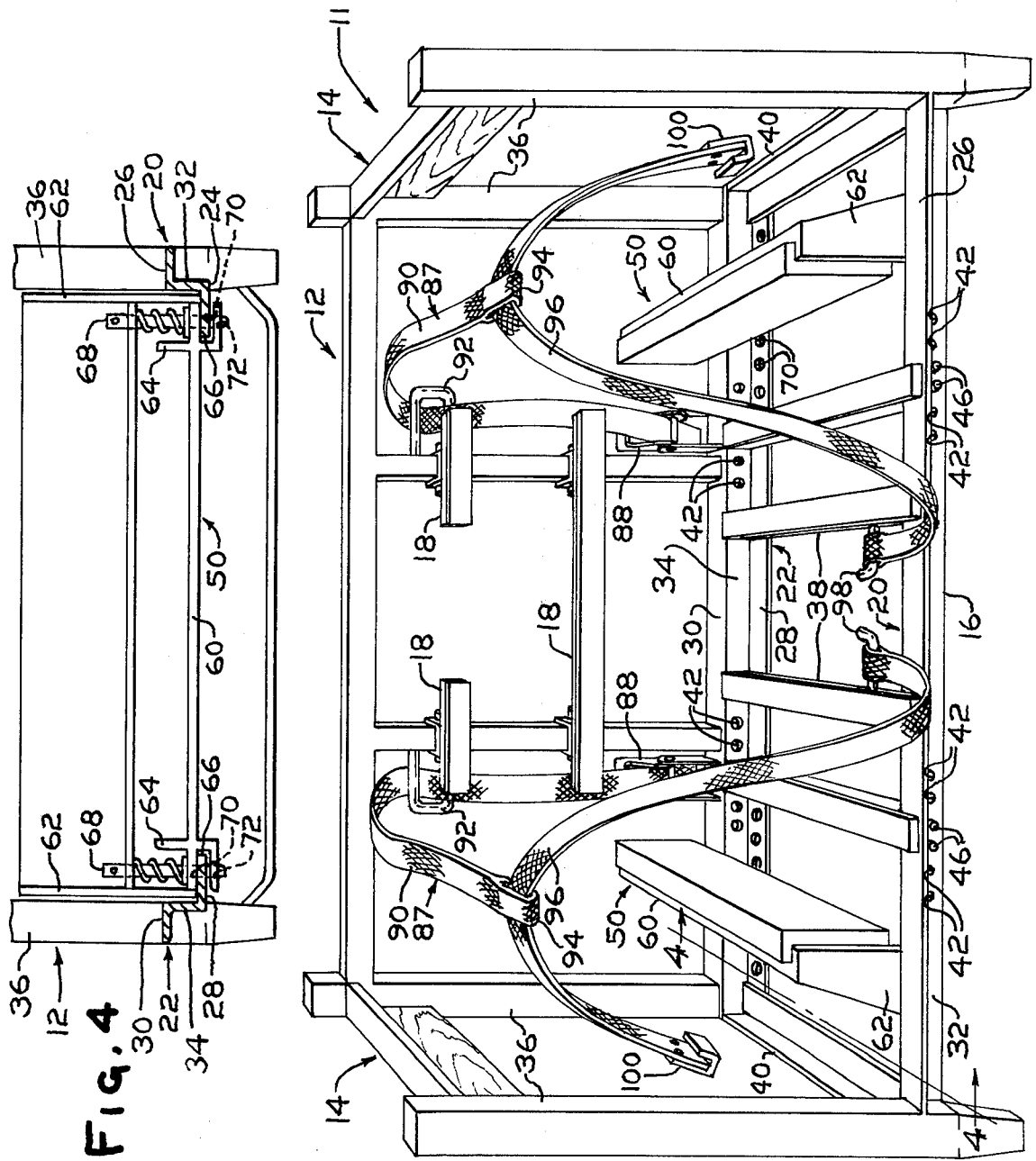

PATENTED JUN 3 1975 3,887,071

SHEET 3

ARTICLE TRANSPORTING RACK

BACKGROUND OF THE INVENTION

1. Field of the Invention

This invention relates to racks or bins used in transporting articles, such as automotive sidelites, windshields and backlites, and more particularly to a rack having an improved (1) frame for supporting a base, (2) end restraint members, and (3) webbing restraint system.

2. Discussion of the Technical Problems

Racks used in transporting articles, for example, automotive sidelites, windshields and backlites should (1) be economical to construct, (2) have maximum structural stability, (3) have end restraint members that minimize lateral movement of the articles in the rack while allowing full utilization of the rack, and (4) a webbing restraint system that minimizes oscillatory movement of the articles during transit.

As can be appreciated, reducing the cost of the racks reduces the investment of glass manufacturers and the racks should have structural stability to prevent damage to the articles during shipping.

The prior art racks or bins used in shipping automotive sidelites were generally constructed of wood. After the racks were unloaded, the racks were discarded which posed an ecology problem.

In general, the racks or bins used in transporting automotive windshields and backlites, i.e., the rear window of an automobile, are constructed of structural steel tubing and are reusable. However, the prior art racks have limitations. More particularly, the frame of the prior art racks that supported the base generally includes a pair of hollow tubes having holes drilled therein for selectively positioning runners, i.e., the base, that support the articles. The runners are held in position by pins which pass through the holes in the tubing and are connected to the ends of the runners.

The drilling of the hollow tubes is an expensive operation and the cost of the racks would be reduced if the drilling step were eliminated. A drawback of using hollow tubes is that the force is distributed between two wall thicknesses through which the pins are inserted. With this arrangement, the force required to shear the wall is less than if there was one wall thickness and shorter pins.

Disclosed in U.S. Pat. No. 3,147,860 is a shipping apparatus, e.g. a rack for sheets or plates, including a base having rails arranged to provide a substantially rectangular framework. The rails are constructed from tubular members. A pair of sheet-supporting frames having a generally Z-shaped configuration are mounted at each side of the apparatus on the rails. The supporting frames are detachably secured in position by a bolt that passes through a leg of the supporting frame and the rail. This type of shipping apparatus has several drawbacks. For example, it is more expensive than conventional racks because of the additional cost of providing the sheet-supporting frame. Further, it increases inventory costs because additional support frames have to be stored for different sizes of sheets or plates.

In general, the end restraint members of the prior art racks include a flat member having a resilient pad on a side surface that engages the articles and a pair of shafts mounted to the other side. The shafts pass through holes formed in the side of the rack to permit movement of the end restraint members toward and away from the articles along the tubular members. The end restraint members are held in position by mounting a plurality of split washers on each shaft between the side of the rack and the side of the end restraint.

The prior art restraint members do not permit full utilization of the rack because the movement of the end restraint members is limited by the length of the shafts. More particularly, the stability of the end restraint members is reduced as the distance from the side of the rack increases. This is because the shafts maintain the end restraint members rigid against rotational motion and the farther the shafts extend from the side of the rack, the less force required to bend them.

If the shafts are moved too close to the side of the rack, the shafts extend beyond the rack creating a safety hazard. Further, when the racks are loaded for shipment and the shafts extend beyond the sides of the rack, dunnage must be used between the racks for side-by-side alignment of the racks against each other.

In general, the webbing restraint system of the prior art racks used to prevent oscillatory motion of the articles about the edge resting on the base includes individual webbed straps, each having a buckle. The buckle applies tension to the straps to urge the articles against the back wall. The prior art webbing restraint system has limitations. More particularly, when a single strap is used, the strap normally passes over the surface of the article farthermost from the back wall of the rack. This has been found to be unacceptable because the strap establishes an axis of rotation and the articles during transit rotate about the axis and are easily dislodged from the row of articles. If two straps and two buckles are used to urge the articles against the back wall of the rack, additional operator time is required to adjust the straps. This is because the operator must adjust the tension of each strap individually such that the tension of each strap is approximately equal to prevent the establishment of two axes of rotation.

SUMMARY OF THE INVENTION

This invention relates to an improved article transporting rack of the type having a first pair of standards and a second pair of standards in spaced relationship to the first pair of standards; a frame mounted between and attached to the first and second pair of standards and a base mounted on the frame to support the articles. The improvement includes the frame including a first pair of solid rigid members mounted to the first and second pair of standards. One of the pair of solid rigid members is mounted to and between the first pair of standards and the other one of the solid rigid members mounted to and between the second pair of standards. A solid rigid member is mounted to each of the first pair of solid rigid members for supporting the base, such that the pair of rigid members and the first rigid member form a pair of inwardly facing L-shaped members. Facilities are attached to the frame for securing the articles on the rack. In a preferred embodiment an additional plate is secured to each of the first pair of solid rigid members such that the frame has a pair of rigid members having a generally Z-shaped configuration.

The securing facilities includes a pair of end restraint members mounted in spaced relationship about the articles on the first rigid members. Facilities are provided for detachably securing each of the pair of end restraints to the L-shaped members to prevent lateral movement of the articles.

The securing means further include a first strap having a free end and a loop at the other end. A second strap mounted in the loop of the first strap and having a first end attached to the rack, e.g. the frame or base, and the other end attached to the rack, e.g. the frame or the base, spaced from the first end. Facilities, e.g. a buckle, are mounted on the rack, e.g. the frame or the base, and operate on the free end of the first strap for applying tension to the first and second strap to urge the articles together to prevent movement of the articles during transit.

The improved article transporting rack of this invention eliminates problems associated with prior art racks. More particularly, by providing the rack with a frame made of a solid rigid member, holes may be formed in the members by punching which is less expensive than the prior art practice of drilling holes in tubular members. Further, pins were inserted in the holes of the tubular members to support the base. Because the pins are required to be long in order to pass through the tubular members, they are easier to bend and shear the wall of the tubular members. By providing a solid wall, the pins can be shorter making them harder to bend and there is less likelihood of the pins shearing the solid rigid members thereby providing a more structurally stable rack.

The end restraints of the prior art racks or bins are attached to shafts that passed through sides of the racks. As the length of the shafts increased, their structural strength decreased. When end restraints of the prior art were positioned close to the sides of the rack, the shafts extended beyond the rack creating a safety hazard and require dunnage between the racks when they are loaded for shipment. The improved end restraints of this invention eliminate the need for the shafts and the problems associated therewith. More particularly, the end restraints are detachably secured to the frame by pins which pass through the solid members of the frame and the ends of the end restraint members.

In the prior art, a single strap was used to urge the articles against the back wall. This established an axis of rotation about which the articles could rotate. Providing two straps and two buckles eliminates the axis of rotation but increases the cost of the restraining system and operator time to apply it. More particularly, each buckle should apply the same tension to their respective straps to prevent establishing two axes of rotation.

The webbing restraint system uses a single buckle which applies tension to a first webbing to apply tension to a second webbing which applies equal compressive forces at spaced areas on the articles, thereby eliminating the limitations of the prior art.

BRIEF DESCRIPTION OF THE DRAWINGS

FIG. 1 is a front elevated view of an article transporting rack embodying the principles of the invention showing one row of automotive sidelites and one row missing for purposes of clarity;

FIG. 2 is a fragmented side view of the rack of FIG. 1 taken along lines 2—2;

FIG. 3 is a front elevated view of an article transporting rack illustrating an alternative embodiment of end restraint members embodying the principles of the invention;

FIG. 4 is a fragmented side view of the rack of FIG. 3 taken along lines 4—4;

DETAILED DESCRIPTION OF THE INVENTION

Figure 5:
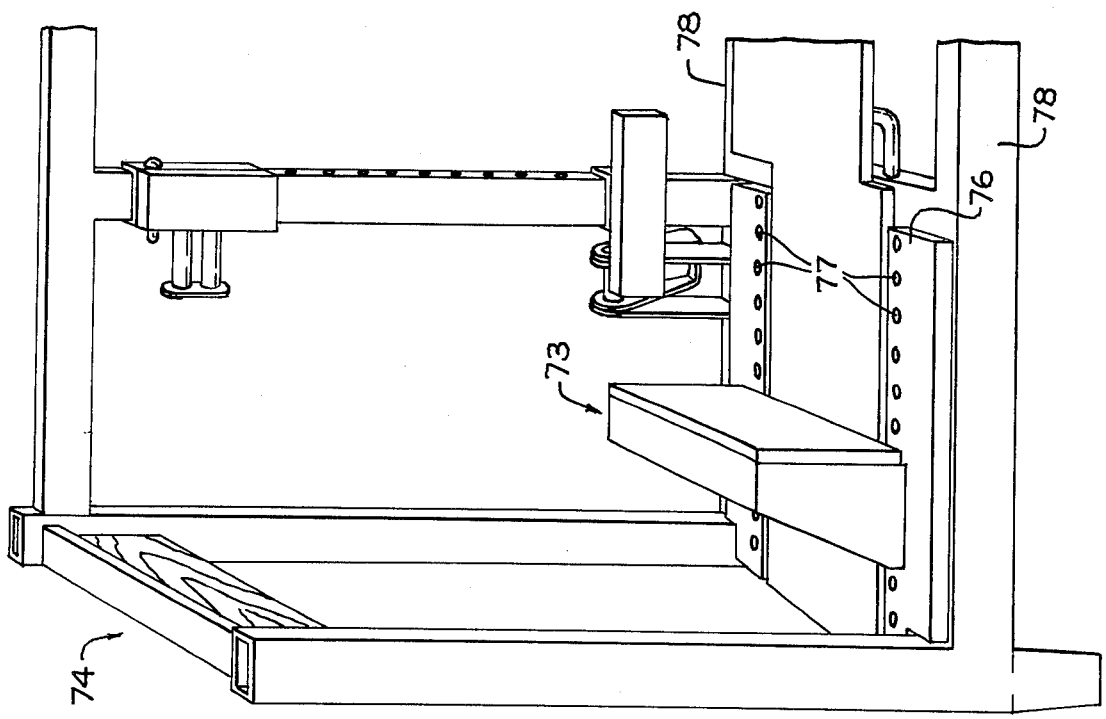
FIG. 5 is a fragmented front elevated view of a conventional rack for transporting articles modified to employ the end restraint members of the invention.

Referring to FIGS. 1 and 3, where like numerals refer to like elements, there is shown an article transporting rack or bin 10 and 11, respectively. In general, the racks 10 and 11 differ in that rack 10 employs a preferred embodiment of end restraint members of this invention, whereas rack 11 employs an alternative embodiment of end restraint members of this invention. The racks 10 and 11 each have a back wall 12 and side walls 14 mounted to a frame 16. The back wall 12 includes a pair of movable back supports 18 to accommodate various patterns of articles such as glass sheets, automotive sidelites, i.e., the side windows of an automobile and automotive windshields, and regulate the tilt of the articles for packing stability.

The frame 16 includes a pair of rigid solid support members 20 and 22 made of structural steel approximately at least three-sixteenths inch in thickness. Each of the supports 20 and 22 includes a pair of outer legs or plates 24 and 26 and 28 and 30 connected by middle leg 32 and 34, respectively, such that the support members 20 and 22 have a generally Z-shaped configuration (see FIGS. 2 and 4). The ends of the support members 20 and 22 are fastened adjacent the bottom of standards 36 as shown in FIGS. 1 and 3 in any conventional manner as by welding.

The support members 20 and 22 may be held in spaced relationship by a pair of stationary runners 38 and a pair of struts 40 preferably having an L-shape which rest on the outer legs 24 and 28 of the support members 20 and 22, respectively, and are fastened thereto in any conventional manner. The struts 40 may be engaged by a fork lift truck to lift the rack 10.

Each of the middle legs 32 and 34 of the support members 20 and 22, respectively, have holes 42 formed therein for selectively positioning movable runners 44 on the base to support the articles 45 such as sidelites on an edge as shown in FIG. 1. The movable runners 44 are supported on the outer legs 24 and 28 of the rigid members 20 and 22, respectively, and detachably secured in place by providing the movable runners 44 with spring biased pins 46 which are inserted in holes 42 of the middle leg 32 and 34. The stationary runners 38, struts 40 and movable runners 44 are considered for purposes of this invention to be a base for supporting the articles. As can be appreciated by those skilled in the art, the invention is not limited to the construction of the base.

Using solid rigid support members 20 and 22, the cost of fabricating the bin is reduced while maintaining the structural stability. More particularly, in conventional prior art racks, the support members are made of structural steel tubing. To provide holes for permitting selective positioning of movable runners, the holes must be drilled in the tubing. Holes 42 may be formed in the middle legs of the support members 20 and 22 by punching which is a less costly operation. Further, the structural stability of the racks 10 and 11 (FIGS. 1 and 3, respectively) is the same if not greater than conventional racks of the prior art. More particularly, the wall thickness of the tubing used in prior art racks is normally one-eighth inch and the pins are sufficient in length to pass through both walls of the tubing. Pins having a relatively large length are easier to bend and also pins passing through two walls have a tendency to shear the wall of the tubing which reduces structural stability of the rack. These drawbacks are eliminated by providing pin 46 which passes through a single wall. Further, the ends of the movable runners 44 engage the middle leg 32 and 34 of the members 20 and 22, respectively, (shown better in FIG. 3) to prevent forward and backward motion of the movable runners 38 relative to the back wall 12.

As can now be appreciated by those skilled in the art, the pair of supports 20 and 22 can be of various configurations, for example, C-shaped, I-shaped or L-shaped.

The discussion will now be directed to end restraint members embodying the principles of the invention. With reference to FIGS. 1-4, there is shown end restraint members 48 (FIGS. 1 and 2) and 50 (FIGS. 3 and 4) embodying the principles of the invention. With specific reference to FIGS. 1 and 2, the end restraint member 48 generally includes a plate 52 approximately one-fourth inch in thickness and of sufficient length such that the ends rest on the outer legs 24 and 28 of the rigid support members 20 and 22, respectively (see FIG. 2). The end restraint members have a height approximately one-fifth of the height of the articles 45 as stacked (see FIG. 1) to prevent lateral movement of the articles 45 relative to the back wall 12 during transit. Formed or attached to the sides of the plate 52 are members 54 having a generally L-shaped configuration and a thickness of approximately three-fourths inch.

A leg 55 of the L-shaped member 54 of the end restraint member 48 rides on the outer legs 24 and 28 of the rigid members 20 and 22, respectively, and is detachably secured in position against the articles by pins 56. The pins 56 pass through holes 42 of the middle legs 32 and 34 of the rigid members 20 and 22, respectively, and holes 58 of the leg 55 of the L-shaped member and detachably secured in position as by cotter pins or bolts.

With specific reference to FIGS. 3 and 4, there is shown another embodiment of an end restraint member of this invention. The end restraint member 50 generally includes a plate 60 similar to the plate 52 of the end restraint members 48 (see FIGS. 1 and 2). Formed or attached to the sides of the plate 60 are generally trapezoidal-shaped members 62 having a side that rests on the outer legs 24 and 28 of the members 20 and 22, respectively. An L-shaped member 64 is attached to the plate 60 near its sides as shown in FIG. 4 to form a C-shaped groove 66 (see FIG. 4) to receive the outer legs 24 and 28 of the members 20 and 22, respectively.

The end restraint member 50 is detachably secured in position against the articles 45 by a spring biased pin 68 which passes through holes 70 formed in the outer legs 24 and 28 and holes 72 formed in a leg of the L-shaped member 64 as shown in FIG. 4.

The end restraint of this invention eliminates the problems of the prior art end restraints. More particularly, the prior art racks utilize shafts which are connected to a side of the end restraint members and pass through holes formed in the side of the rack. The end restraint members are held in position by providing a plurality of lock washers over the shafts between the sides of the rack and the end restraint members which prevent movement of the end restraint members away from the articles. If the end restraint members move too close to the side of the rack, the shafts extend beyond the rack creating a safety hazard and require dunnage between adjacent racks when loaded for shipment. If the shafts are extended too far from the side, in other words, moving the end restraint members toward each other against the sides of the articles, the end restraint members have reduced structural stability. This is because as the shafts extend, the amount of force required to bend them decreases. By using the end restraint member of the invention, there are no shafts to limit the positioning of the end restraint members. Regardless of the position of the end restraint members relative to the side of the rack, the structural stability remains the same.

Figure 6:
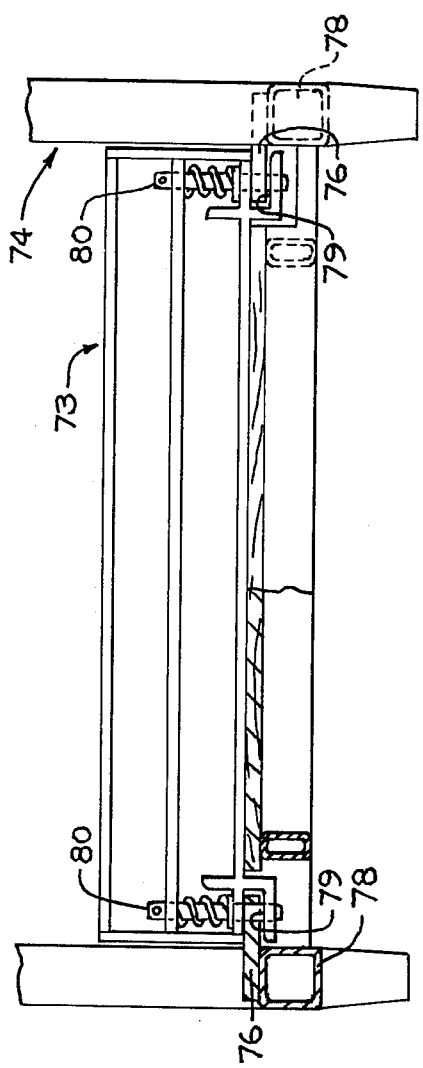
FIG. 6 is a fragmented end view of the rack of FIG. 5 having portions cut away for purposes of clarity.

As can now be appreciated by those skilled in the art, the end restraint members of the invention can be used on prior art racks without deviating from the scope thereof. More particularly, with reference to FIGS. 5 and 6, there is shown an end restraint member 73 similar to end restraint member 50 of FIG. 3 used on a prior art article transporting rack 74. A plate 76 is advantageously mounted on the tubular members 78 (see FIG. 6) and has holes 77 formed therein. A C-shaped groove 79 of the end restraint member 73 similar to the C-shaped groove 66 of the end restraint member 50 rides along the plate 76 and is detachably secured in position by spring biased pins 80 as previously described for detachably securing end restraint member 50 with pins 68 (see FIG. 3).

With reference to FIG. 1, the bin 10 is loaded with articles 45 such as sidelites in the following manner. The movable runners 44 are positioned from the stationary runners 38 a sufficient distance to support an edge of the sidelites (see FIG. 1). Two rows of sidelites 45 are loaded on the rack 10. However, for purposes of clarity, in discussing the webbing restraint system embodying the principles of the invention, only one row is shown. The end restraint members 48 are urged against each row of sidelites and detachably secured in position by pins 56 which pass through holes 42 of the middle legs 32 and 34 of the members 20 and 22, respectively, and holes 58 of the leg 55 of the L-shaped member 54 to prevent lateral motion of the sidelites during shipping. The two rows are separated by a rigid spacer 82. To prevent damage to the sidelites, all surfaces of the rack and elements contacting the sidelites are provided with a resilient material 84 such as rubber and the sidelites are separated by interleaves 86 such as dimpled paper.

The sidelites are held in the rack by a restraining system. Shown in FIGS. 1 and 3 is a webbing restraint system 87 embodying the principles of the invention. With reference to FIGS. 1 and 3, the restraint system 87 generally includes a buckle 88 mounted to the outer leg 30 of the support member 22. A polyester webbing strap 90 has one end connected to the buckle 88 and has its course passing up behind the row of sidelites 45, through a guide slot 92 mounted on the back wall (shown better in FIG. 3) and a loop 94 advantageously formed at the other end.

A second webbing 96 has one end advantageously attached to a shaft 98 mounted to the stationary runners 38 and has its course passing over the surface of the outermost sidelite, through the loop 94 of the first webbed strap 90, down over the surface of the outermost windshield, below the windshields, and the other end provided with a hook member 100 which engages the leg 30 of the rigid member 22. Friction pads 102 are provided on the webbing 100 to prevent movement of the webbing during transit.

The buckle 88 may be of any conventional types such as the type sold by Eastern Rotorcraft Corporation Catalog No. 702 which is used to put the webbed straps 94 and 100 in tension to urge the articles 45 against the back wall 12 and to prevent oscillatory movement of the sidelites, i.e., rotational movement of the sidelites about the edge resting on the runners 44 and 38 toward and away from the back wall, during transit.

As can be appreciated, the restraint system 87 of the present invention eliminates the problems associated with webbing restraint systems. More particularly, the prior art webbing restraint systems utilize a single strap having one end connected to the base and has its course passing over the surface of the outermost windshield, over the top of the articles and down the surface of the innermost windshield and connected to a buckle. As tension is applied to the webbing, the articles are urged against the back wall of the bin. The single strap establishes an axis of rotation for the articles and the articles are easily dislodged from the rows of articles. If two straps and buckles were used, additional operator time would be required to secure the articles in the rack to assure that each strap had approximately the same compressive force to prevent the establishment of two axes of rotation.

What is claimed is:

1. An improved article transporting rack of the type having a first pair of standards and a second pair of standards in spaced relationship to the first pair of standards; a supporting backwall secured between the first pair of standards; a frame mounted between and attached to the first and second pair of standards; and a base mounted on the frame to support the articles, the improvement comprising:
   the frame comprising:
   a pair of solid, rigid members each having a vertical leg and a horizontal leg, a one of said rigid members secured to the first pair of standards with the horizontal leg extended toward the second pair of standards and the vertical leg extended upward and the other one of said rigid members secured to the second pair of standards with the horizontal leg extended toward the first pair of standards and the vertical leg extended upward;
   the horizontal leg of each of said solid rigid members supports the base in a horizontal plane;
   the vertical leg of each of said solid members prevents movement of the base toward and away from the back wall; and
   means attached to the frame for securing the articles on the rack.

2. The improved rack as set forth in claim 1 further including:
   a pair of solid, rigid plates one of which is (1) securely attached between the first pair of standards and to the vertical leg of said rigid member between the first pair of standards and (2) extending away from the second pair of standards and the other one of said rigid plates (1) securely attached between the second pair of standards and to the vertical leg of said rigid member between the second pair of standards and (2) extending away from the first pair of standards.

3. The improved rack as set forth in claim 1 wherein said securing means includes:
   a pair of end restraint members each supported on the horizontal leg of said solid rigid members in spaced relation to each other; and
   means for detachably securing said pair of end restraints to said pair of rigid members to prevent lateral movement of articles to be shipped.

4. The improved rack as set forth in claim 3 wherein said means for detachably securing includes:
   the vertical leg of said solid, rigid members having a plurality of holes formed therein; and
   a support member secured at opposed sides of each of said pair of end restraint members, said support members each having at least one hole formed therein wherein the at least one hole of said support members is alignable with at least one hole of the plurality of holes formed in each of the vertical legs of said rigid members.

5. The improved rack as set forth in claim 3 wherein said means for detachably securing includes:
   said end restraint members having a generally C-shaped groove at opposed sides for receiving the horizontal leg of said rigid members; and
   pin means for securing said end restraints in position.

6. The improved rack as set forth in claim 1 wherein said securing means includes:
   a first strap having a free end and a loop at the other end;
   a second strap mounted in the loop of said first strap and having a first end attached to the base and the other end attached to the frame spaced from the first end of said second strap;
   means mounted on the rack and operating on the free end of said first strap for applying tension to said first and said second strap to urge the articles to be shipped together against the back wall of the rack to prevent movement of the articles toward and away from the back wall during transit.

7. The improved rack as set forth in claim 1 wherein each of said solid, rigid members includes a first solid, rigid plate and a second solid, rigid plate secured together.

8. An improved article transporting rack of the type having a first pair of standards and a second pair of standards in spaced relationship to the first pair of standards; a supporting back wall secured between the first pair of standards, a first rigid member secured between and to the first pair of standards; a second rigid member secured between and to the second pair of standards; a base for supporting articles, the base supported in the horizontal position by the first and second rigid members; the improvement comprising:
   a plate securely mounted on each of the first and second rigid members;
   a pair of end restraints;
   means for slideably mounting said pair of end restraints on said plates; and
   means for detachably securing said pair of end restraints on said plates in spaced relationship to each other.

9. The improved end restraint member as set forth in claim 8 wherein said means for slideably mounting includes:

said pair of end restraints each having a generally C-shaped groove adjacent one side for receiving said plate on the first rigid member and a C-shaped groove adjacent the opposite side for receiving the plate on the second rigid member.

10. An article transporting rack of the type having means for supporting articles; and a back wall mounted to the supporting means to support the articles such that an edge of the articles article rests on the support means with the articles tilted toward the back wall, the improvement comprising:

a first strap having a free end and a loop at the other end;

a second strap mounted in the loop of said first strap and having the first end attached to the supporting means and the second end attached to the supporting means spaced from the first end of said second strap, said second strap adapted to pass over a surface of an over the surface of an outermost article; and means mounted on the rack for operating on the free end of said first strap to apply tension to said first and second strap to urge the articles against the back wall to prevent movement of the articles toward and away from the back wall.

* * * * *

UNITED STATES PATENT OFFICE
CERTIFICATE OF CORRECTION

PATENT NO. : 3,887,071
DATED : June 3, 1975
INVENTOR(S) : Ronald J. Thomaswick

It is certified that error appears in the above-identified patent and that said Letters Patent are hereby corrected as shown below:

Claim 10, line 4, delete "article" after "articles".

Claim 10, line 14, delete "over the surface of an" after "of an".

Signed and Sealed this twenty-sixth Day of August 1975

[SEAL]

Attest:

RUTH C. MASON
*Attesting Officer*

C. MARSHALL DANN
*Commissioner of Patents and Trademarks*